United States Patent [19]

Machida

[11] 4,454,535

[45] Jun. 12, 1984

[54] COLOR PICTURE PROJECTION SYSTEM

[75] Inventor: Toyotaka Machida, Kashiwa, Japan

[73] Assignee: Victor Company of Japan, Limited, Yokohama, Japan

[21] Appl. No.: 292,533

[22] Filed: Aug. 13, 1981

[30] Foreign Application Priority Data

Aug. 15, 1980 [JP] Japan ................... 55-112323

[51] Int. Cl.³ ........................... H04N 9/31
[52] U.S. Cl. ................... 358/60; 350/317; 353/84
[58] Field of Search ............ 358/60, 42, 61, 47, 358/55, 231, 237, 250, 253; 350/80, 117, 127, 122, 123, 408, 317; 353/84, 31; 354/100

[56] References Cited

U.S. PATENT DOCUMENTS

| 2,837,087 | 6/1958 | Sawyer | 350/408 |
| 3,470,310 | 9/1969 | Shashoua | 358/61 |
| 3,549,238 | 12/1970 | Graser | 350/408 |
| 3,572,900 | 3/1971 | Bouche | 358/60 |
| 3,821,794 | 6/1974 | Yoneyama | 350/317 |

FOREIGN PATENT DOCUMENTS 1925221  3/1969  Fed. Rep. of Germany ........ 358/60

*Primary Examiner*—Tommy P. Chin
*Attorney, Agent, or Firm*—Lowe, King, Price & Becker

[57] ABSTRACT

A color picture projection system having a color picture light source and a lens system for magnifying the picture to project the same on a screen is provided with an optical filter for removing the effect of chromatic aberration. The lens system has a simple structure, for instance, two parallel lenses, each designed to pass a given wavelength. In a first embodiment, an annular optical filter partially blocks red and blue light rays incident on one side thereof. In a second embodiment, two coaxial annular optical filters are combined in a single filter to partially block the red light rays incident on a first portion thereof and to partially block red and blue rays incident on a second portion which is outside the first portion.

8 Claims, 6 Drawing Figures

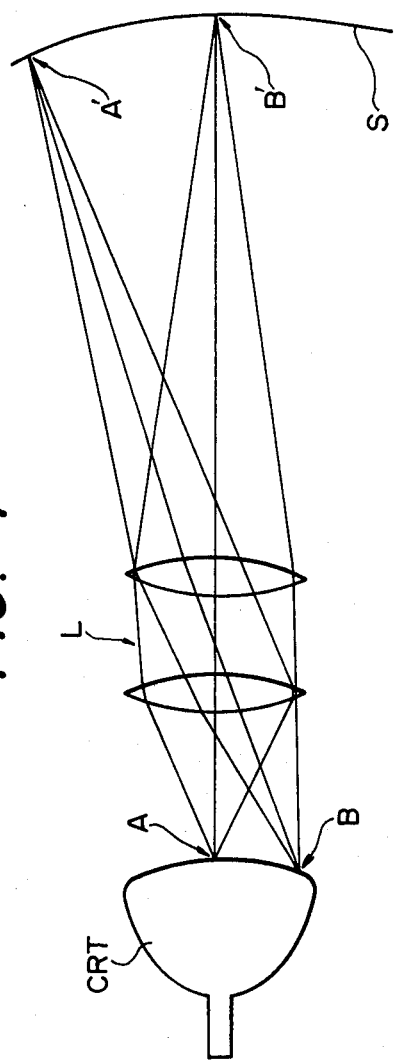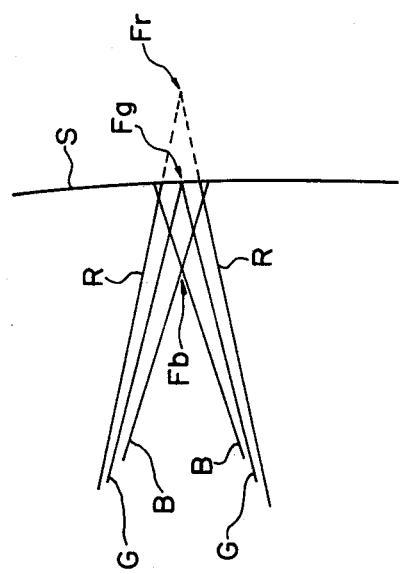

COLOR PICTURE PROJECTION SYSTEM

BACKGROUND OF THE INVENTION

This invention relates generally to color picture projection systems in which a color picture from a color picture source is projected on a screen by irradiating rays of different colors, and more particularly, the present invention relates to an improvement in a lens system used in such a color picture projection system.

Customary color television sets, which are widely used, employ a cathode ray tube having a fluorescent surface to convert electrical energy into light of three different primary colors, i.e. red green and blue. However, the size of such a cathode ray tube cannot be freely increased. Therefore, in order to provide a larger picture various color picture projection systems have been previously developed, and various types of such color picture projection systems are already on market.

Generally speaking, in conventional, marketed color picture projection systems, three projection tubes are provided for respectively emitting red, green and blue light rays. These three different rays are respectively transmitted through respective lens systems to be focussed on a suitable screen so as to project a color picture image thereon by superimposing three images of different colors on each other. Therefore, the conventional color picture projection systems have required three separate lens systems, and thus, the conventional projection systems of this sort are complex in structure, resulting in a high manufacturing cost.

Here, it is to be noted that in the prior art, three different projection tubes for respectively emitting red, green and blue rays have been essential because it was impossible to provide a color picture projection system by utilizing a single cathode ray tube. To the uninitiated it would seem that an inexpensive simple color picture projection system involves magnifying the color picture on the fluorescent surface of a cathode ray tube by means of a single lens system that projects the picture on a screen. However, the diameter of each lens of such a lens system must be large as the size of the fluorescent surface of the cathode ray tube. Such a large size lens suffers from problems of chromatic aberration. The effect of chromatic aberration can be removed if various lenses are combined in a complex manner as is well known. However, the diameter of each lens in the lens system is much larger than that of easily handled cameras or the like. Such a lens system has a complex structure, is very expensive, bulky and heavy, causing the color picture projection system to have a high manufacturing cost.

For the above reason, it has been necessary for customary, practical, color projection systems to use three independent lens systems respectively responsive to light of the three primary colors emitted by three tubes.

SUMMARY OF THE INVENTION

The present invention has been developed in order to remove the above-described drawbacks and disadvantages inherent in the conventional color picture projection systems.

It is, therefore, an object of the present invention to provide a new and useful color picture projection system which is simple in construction and low in cost.

According to the present invention each lens of the lens system is designed by using a given wavelength so that the lens system has a small f-number. An optical filter having a center opening partly blocks rays of given colors. Namely, the optical filter functions as an aperture stop with respect to given wavelengths so as to minimize the effect of chromatic aberration while the brightness of the picture on the screen is ensured.

In accordance with the present invention there is provided a color picture projecting system comprising: (a) a color picture light source for emitting three primary color light rays; (b) a lens system for magnifying the picture from said color picture light source so that said picture is projected on a screen, said lens system having lenses designed to pass a wavelength of the green light rays so as to accurately focus said green light rays on said screen; and (c) an optical filter for blocking the red and blue light rays which tend to are transmitted through a portion of the lens system removed from the center of said lens system.

In accordance with the present invention there is also provided a color picture projecting system comprising: (a) a color picture light source for emitting three primary color light rays; (b) a lens system for magnifying the picture from said color picture light source so that said picture is projected on a screen, said lens system having lenses designed to pass a wavelength which is slightly different from that of the green rays; and (c) an optical filter having first and second portions which are coaxially arranged in such a manner that said first portion is surrounded by said second portion, said first portion having an optical characteristic such that the red light rays incident on one side thereof is blocked, said second portion having an optical characteristic such that the red and blue light rays incident on one side thereof are blocked, said optical filter having a center opening through which all the red, green and blue light rays are transmitted from said color picture light source to said screen.

In accordance with the present invention there is also provided an optical system for obtaining a color image, comprising: (a) a lens system having at least one lens designed to pass a wavelength of particular color light; and (b) an aperture stop made of an optical filter for reducing the amount of light transmitted through said lens system, said optical filter having a portion which does not function as an optical filter at its center, and having a given color so as to selectively transmit light of given wavelengths.

In accordance with the present invention there is further provided an optical system for obtaining a color image, comprising: (a) a lens system having at least one lens designed to pass a light wavelength of a particular color; and (b) an aperture stop made of an optical filter for reducing the amount of light transmitted through said lens system, said optical filter having a portion which does not function as an optical filter at its center, and having a first portion of a given color so as to selectively transmit light of given wavelengths and a second portion of another given color so as to selectively transmit light of given wavelengths, said second portion being located outside said first portion.

BRIEF DESCRIPTION OIF THE DRAWINGS

The object and features of the present invention will become more readily apparent from the following detailed description of the preferred embodiments taken in conjunction with the accompanying drawings in which:

FIG. 1 is an explanatory view of a color picture projection system having no optical filter;

FIG. 2 is an enlarged explanatory view around the screen of FIG. 1, illustrating an undesirable effect of chromatic aberration due to the simple structure of the lens system used in the color picture projection system;

Figure 5:
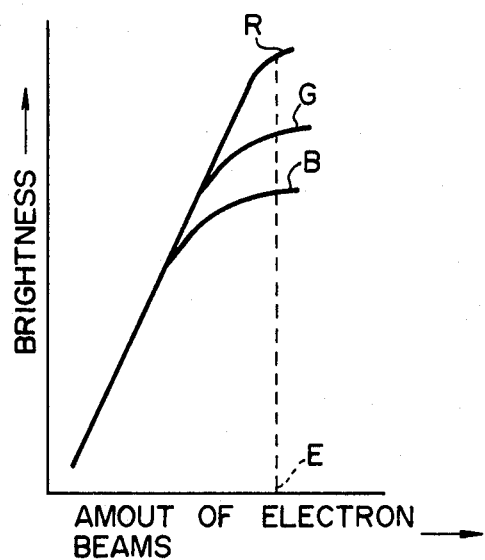
Figure 6:
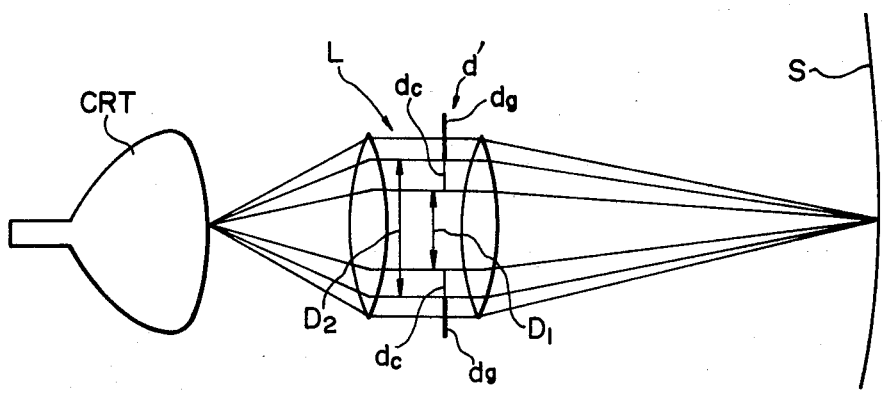

FIG. 5 is a graphical representation of the intensities of three primary color light rays from a three-color CRT of the shadow mask type with respect to the intensity of electron beams incident on the CRT phosphor face; and FIG. 6 is a schematic top plan view of a second embodiment of the color picture projection system according to the present invention, in which an annular optical filter having two different portions is used.

The same or corresponding elements and parts are designated at like numerals throughout the drawings.

DETAILED DESCRIPTION OF THE INVENTION

Prior to describing preferred embodiments of the present invention, the principle of the invention is described with reference to explanatory diagrams of FIGS. 1 and 2.

FIG. 1 is a schematic top plan view of a color picture projection system in which a color picture incident on a display surface, i.e. fluorescent surface, of a picture tube, such as a cathode ray tube (CRT) of the shadow mask type, is magnified by means of a lens system "L" simply formed by two series lenses; the picture is projected on a screen "S". The CRT is of the normal type, used for normal television sets, and emits three primary color light rays, i.e. red, green and blue rays.

Assuming that there is no effect of chromatic aberration in the lens system "L", a ray emitted from a central point "A" of the display surface of the CRT is focussed on a peripheral point "A'" of the screen "S", while another ray from a peripheral point "B" of the CRT surface is focussed on central point "B'" of screen "S". Actually, however, the lens "L" having such a simple construction suffers from effect of chromatic aberration as is well known. Therefore, the rays from respective points "A" and "B" on the display surface of the CRT are not necessarily focussed on the points "A'" and "B'" on the screen "S" the rays are focused on screen "S" at points dependent on the wavelength of the light transmitted through the lens system "L".

FIG. 2 is an enlarged explanatory view in the region of screen "S" of FIG. 1. Assume that the lens system "L" of FIG. 1 has been designed so as to accurately focus green light rays on point "Fg" of screen "S". It is further assumed that the point "A" on the display surface of the CRT emits red, green and blue rays "R", "G" and "B". Since the lens system "L" is designed to accurately focus the green rays "G" on a point "Fg" on the screen "S", the remaining rays, i.e. red rays "R" and blue rays "B", are respectively focussed at points "Fr" and "Fb" which are respectively behind the screen "S" and in front of the screen "S". In other words, the red rays "R" and blue rays "B" are not accurately focussed on the surface of the screen "S". As a result, a red spot formed on the screen "S" by the red rays "R" and a blue spot formed on the screen "S" by the blue rays "B" are both larger in diameter than a focused green spot formed by the green rays "G".

The same phenomena as the above occurs in connection with the rays of the three primary colors from the entire display surface of the CRT. Accordingly, the picture projected on the screen "S" by the system of FIG. 1 is very poor, suffering from color deterioration; therefore, such a color picture projection system is not practical.

According to the present invention an optical filter is employed in a particular manner as described hereinafter so that a practical color picture projection system can be provided at low cost.

Figure 3:
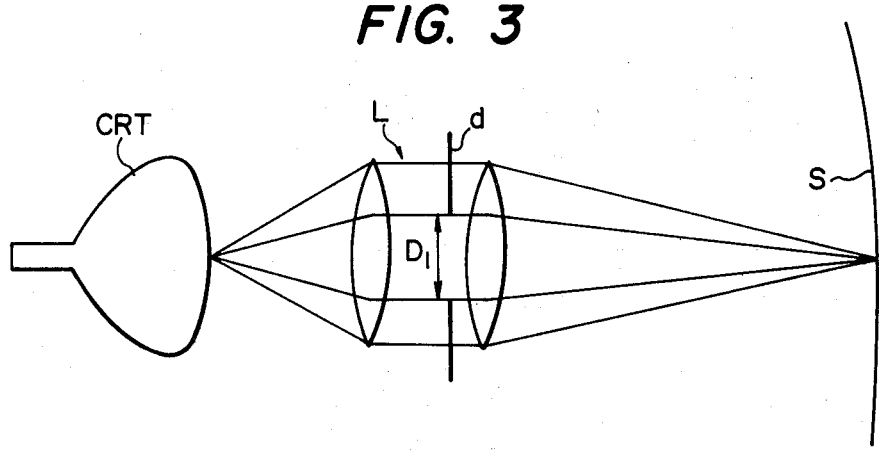
FIG. 3 is a schematic top plan view of a first embodiment of the color picture projection system according to the present invention, in which an annular optical filter is used.

Reference is now made to FIG. 3, a schematic top plan view of a first embodiment of the color picture projection system according to the present invention. The color picture projection system of FIG. 3 comprises a color picture light source CRT which emits three primary color light rays, a lens system "L" and an optical filter "d". The projecting system is used for magnifying the color picture displayed on the display surface of the color picture light source CRT so as to project the magnified picture on a screen "S". The light source in this and the following embodiment is a three-color cathode ray tube (CRT) of the shadow mask type. The optical filter "d" has an annular shape as shown, and is arranged between two lenses of the lens system "L". The two lenses of system "L" are arranged in series, having a space therebetween, with the longitudinal axes of the lenses being perpendicular to the optical axis of the lens system.

As is well known, the degree of the effect of chromatic aberration of a particular lens varies in accordance with the aperture, i.e. the diameter of the lens. A lens having a larger aperture (that is a lens having a smaller f-number) suffers from the effect of chromatic aberration more than a lens having a smaller aperture. Hence, undesirable chromatic aberration can be minimized by using a small-aperture lens. However, if the aperture of each lens of the lens system "L" of FIG. 1 were simply reduced to an extent enabling the effect of chromatic aberration to be ignored by using a conventional aperture stop, the picture projected on the screen "S" may be too dark to be practical.

In order to ensure adequate brightness for the picture projected on the screen "S", the lenses of the lens system "L" of FIG. 3 are designed such that the aperture of each of the lenses is as large as possible. Furthermore, because the green rays "G" of the three primary color rays "R", "G" and "B" contribute to a high degree to the brightness of the color picture on the screen "S", the lenses of the lens system "L" are designed so that green rays "G" are most accurately focussed on the screen. In other words, the wavelength of the green light from the CRT is used in designing the lenses of system "L". However, the lens system "L" cannot be used as it stands because it would suffer from the effects of chromatic aberration as described above. On the other hand, if an aperture stop were simply provided to reduce the effective aperture of the lens system by limiting the rays which tend to pass through a portion of each of the lenses, other than the center thereof, the color picture projected on the screen "S" would be too dark.

According to the present invention the annular optical filter "d" designed such that only the green rays "G" are transmitted therethrough, while the red and blue rays "R" and "B" are blocked. Namely, the optical filter "d" has wavelength selectivity. Since the optical filter "d" has an annular shape, that is the optical filter "d" has a central opening, as described above, all of the rays applied to the center portion D1 of the lens system "L" from the CRT propagate through the lens system without being blocked by the optical filter "d"1 in contrast the red and blue rays "R" and "B" applied to the outside of the center of the lens system "L" are blocked. Consequently, the annular optical filter "d" functions as an aperture stop with respect to the red and blue rays "R" and "B". Meanwhile, since the optical filter "d" does not block the green rays "G", the entire lens system "L" functions as a large aperture lens system with respect to the green rays "G". This greatly contributes to the brightness of the projected picture. As described above, since the lens system "L" has been designed so as to correspond to the wavelength of green light, the green rays "G" from the CRT are accurately focussed on the screen "S", projecting spots with sufficiently small diameter. The red and blue rays "R" which would be projected as larger spots on the screen "S", are partly limited by the annular optical filter "d" to an extent that red and blue spots of practical size are projected on the screen "S".

The optical filter "d" of FIG. 3 may be made of a sheet of colored cellophane paper or gelatine filter. A sheet of cellophane paper or gelatine filter is cut to take the above mentioned annular shape, and then the cut filter is attached to a transparent glass plate (not shown) or the like. Although the optical filter "d" is shown in the space between the two lenses of the lens system "L" in FIG. 3, the optical filter may be cut to a desired shape and directly attached to the surface of one of the lenses. In this case, the above-mentioned glass plate is not needed.

With the provision of the optical filter "d" the intensities of the red and blue light passing through the lens system "L" are limited compared to the intensity of the green light. If the intensity of the three color light rays emitted from CRT are equal to each other, only the green light is emphasized on the screen because the brightness of the green rays on the screen "S" is greatest among the three primary colors. Under this condition, the color of the picture projected on the screen "S" is greenish. In order to cure this defect, the intensity of the red and blue light emitted from the CRT may be increased compared to that of the green light, or the intensity of the green light from the same may be decreased compared to those of others. Namely, by adjusting the optical output intensity of each of the three primary color lights emitted by tube CRT, the color tone of the projected picture can be readily controlled, as desired.

Figure 4:
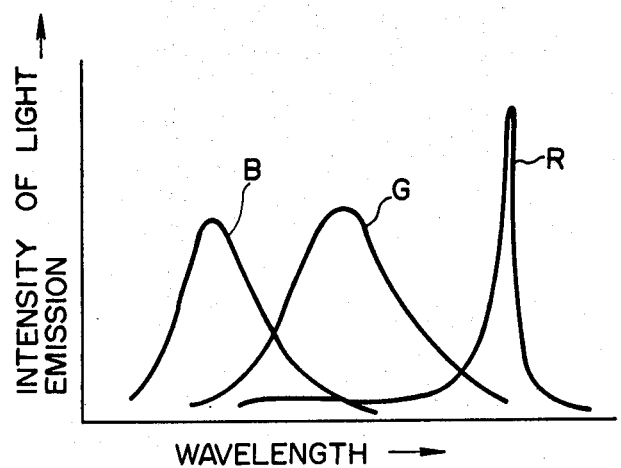
FIG. 4 is a spectrum diagram of the three primary color light rays from a three-color CRT of the shadow mask type.

In order that the optical filter "d" of FIG. 3 effectively operates, it is desirable for the wavelength bands of the three primary color lights to be independent of each other in the spectrum. FIG. 4 is a graph of a spectrum of light emitted from the fluorescent surface of a three-color CRT of the shadow mask type. This spectrum is widely used at present. Even if the wavelength bands of adjacent light colors overlap each other, as shown in this graph, the optical filter "d" is capable of functioning satisfactorily.

If there is an overlap in the distribution of wavelength bands in the spectrum of the three primary colors at the color display surface of a color picture light source, it is preferable to use a filter having a narrow transmitting band as the optical filter "d". Thereby, only light having a wavelength approximately that of the wavelength used in designing the lens system "L" can propagate through the optical filter "d". With this arrangement, an improvement in chromatic aberration suppression can be further satisfactorily achieved. This is also true in connection with the following second embodiment of FIG. 6.

In the first embodiment of FIG. 3, a CRT is used as the color picture light source emitting three primary color rays; however, other light sources can be used for the three primary color ray cource, if desired. For instance, a slide projector can be used in place of the CRT in such a manner that a color slide is placed at the position of the fluorescent surface of the CRT of FIG. 3. Furthermore, a reflective type projector may be used in the same manner by placing a color picture sheet at the position of the fluorescent surface of the CRT. The light source of such a slide projector or such a reflective type projector is preferably a three-primary color light source capable of emitting red, green and blue light rays, each having wavelength bands separated from each other as much as possible in the spectrum.

Generally speaking, if there is no limit in the maximum brightness of the respective primary color light rays emitted from the color display surface of a color picture display, the brightness or intensity of each color can be freely adjusted to a desired value. However, in the case of a three-color CRT of shadow mask type, the maximum saturation brightness of the respective primary colors are different from each other.

FIG. 5 is a graph of one example of the amount of the brightness of the respective color light rays emitted from the fluorescent surface of a CRT of the shadow mask type with respect to the intensity of electron beams directed to the fluorescent surface. As is apparent from the graph of FIG. 5, the amount of light emission increases as the electron beams intensity increases. However, the maximum saturation brightness level of each primary color is different from each other, where these levels are defined by the property of the fluorescent substance. In detail, the blue light "B" saturates at a relatively dark point, while the red light "R" does not saturate as far at the maximum electron beam intensity. In normal color television sets, the CRT is used in such a manner that each of the three primary color does not saturate. In other words, the intensity of each of the red and green lights is limited to be of the same level as that of the blue light. However, in a color picture projection system, the intensity of each primary color should be as great as possible in order to project a clear and bright picture on a large screen. The above-mentioned variation in the intensity of the three primary colors occurs not only in a CRT but also in the above-mentioned slide projectors, reflective type projectors or the like.

The inventor of the present invention has devised a color picture projection system which is capable of projecting a color picture in a satisfactory manner even if there is a variation in the intensity of the respective primary color light rays emitted from the color display.

Hence, reference is now made to FIG. 6, a schematic top plan view of the second embodiment of the present invention with this feature. The second embodiment differs from the first embodiment of FIG. 3 the structure of the optical filter "d'" is more complex than that of filter "d". The second embodiment is described on the asssumption that the intensities of respective primary color light rays from the CRT are different from each other as shown in FIG. 5. Namely, it is assumed that the CRT is operated at electron beam intensity level "E", FIG. 5. Since the intensity of the red ray "R" is higher than the others, a bright picture can be projected on the screen "S" even if the lens system "L" has a large f-number by greatly reducing the effective aperture. On the contrary, since the intensity of the blue ray "B" is low, the f-number in connection with the blue light should be as large as possible by slightly applying an aperture stop. Furthermore, it is necessary for the lens system "L" function as a large aperture lens having a small f-number with respect to the green light rays "G" to project a bright color picture on the screen "S".

In order to meet the above requirements, if the red and blue lights "R" and "B" respectively have the highest and lowest intensities, and the wavelength used for designing the lenses of the lens system "L" deviates slightly from the wavelength of the green rays "G" toward the blue rays "B". As a result, the effect of chromatic aberration in connection with the blue light "B" is not emphasized. The wavelength used for designing the lens system "L" is selected in a range such that the intensity of the green light "G" in the spectrum curve is sufficiently high to ensure an adequate brightness of the picture projected on the screen "S".

The lens system "L" obtained in the above-described manner functions as a large aperture lens with respect to the green light rays "G", and thus, the green light rays "G" are adequately focussed on the screen. Meanwhile, the lens system "L" has a slight chromatic aberration for the blue light rays "B", and a great chromatic aberration for the red light rays "R" if no optical filter is used therewith.

To design a suitable optical filter, an aperture stop number is employed such that the effect of chromatic aberration for the red light rays "R" can be ignored. Also provided is another aperture stop number in which the effect of chromatic aberration for the blue light rays "B" can be ignored.

In the above, the effective aperture for the red light rays "R" is the smallest, while the effective aperture for the blue light rays "B" is larger than the former. Since the wavelength used for designing the lens system "L" deviates from the wavelength of the green light toward that of the blue light, the effective aperture for the blue light rays "B" can have a value close to the aperture for the fully opened state.

In FIG. 6, the optical filter "d'" includes an aperture stop having a wavelength selectivity so that the optical filter "d'" has two different aperture stop numbers for the red light and blue light. The optical filter "d'" has an annular shape in the same manner as in the first embodiment. Filter "d'" is different from the first embodiment in that the optical filter "d'" comprises first annular portion "dc" and a second annular portion "dg", integrally formed with the first annular portion "dc" in such a manner that the first annular portion "dc" is received in the center opening of the second annular portion "dg". The first annular portion "dc" has a given characteristic enabling the green light rays "G" and the blue light rays "B" to be transmitted therethrough. On the other hand, the second annular portion "dg" has a given characteristic enabling only the green light rays "G" to be transmitted therethrough. Optical filter "d'" includes a center opening "D", enabling all of the red light rays "R", the green light rays "G" and the blue light rays "B" to be transmitted through opening D1. With this arrangement, the red light rays "R" propagate through only opening D1, while the blue light rays "B" propagate through portion D2, having a diameter equal to that of the first annular portion "dc". On the other hand, the green light rays "G" propagate through the entire area of the lens system "L". The first annular portion "dc" is a cyan optical filter, while the second annular portion "dg" is a green optical filter.

Since the second embodiment color picture projection system of FIG. 6 operates by selectively transmitting the red, blue and green light rays "R", "G" and "B" as described above, the color picture projected on the screen "S" is sufficiently bright, while the effect of chromatic aberration is minimized to an extent that it does not raise any problem for practical use.

The wavelength used for designing the lens system "L" of the second embodiment has been described, assuming that the wavelength focused on screen "S" slightly deviates from the wavelength of the green light toward the blue light because the intensities of the red, blue and green light rays emitted from the CRT are assumed to take values as shown in FIG. 5. Namely, the wavelength shift or deviation from the the green light wavelength may be determined in accordance with the maximum intensities of the respective primary colors emitted from the color picture light source, and in accordance with the desired brightness to be obtained from the screen "S", as well as the degree of allowable effect of the chromatic aberration.

The intensities of the respective primary color light rays emitted from the CRT of FIG. 6 may be controlled so that the color tone of the picture on the screen "S" is a desired.

From the above second embodiment if the maximum intensity of red or blue light respectively residing at both ends of the visible ray band is higher than the other, an optical filter functioning as a smaller aperture stop with respect to the higher maximum intensity light may be provided to ignore the effect of chromatic aberration. Another optical filter, functioning as a larger aperture stop with respect to the lower maximum intensity light, may be provided outside the former optical filter. Namely, the red light having the highest intensity in the second embodiment can be greatly stopped down by providing an aperture stop having a relatively small aperture. Since the amounts of the red and blue light rays "R" and "B" are respectively reduced such that the red light rays "R" having the highest intensity are greatly stopped down, the total energy of the light source can be suppressed to obtain adequate brightness compared to the case wherein all three primary color rays are reduced.

The color picture projection system of the present invention provides satisfactorily results when: (a) a color picture on the display surface has a diagonal length (b) 30 centimeters, of a color display is projected on a screen having a diagonal length of 1 meter or so by means of a lens system having an f-number of F 1.5 (c) the lens system includes a simple structure of two lenses, each having a diameter of 30 centimeters or so.

The above-described embodiments are just examples of the present invention, and therefore, it is apparent to those skilled in the art that many modifications and variations may be made without departing from the spirit of the present invention.

What is claimed is:

1. A color picture projecting system comprising:
   (a) a color picture light source for emitting three primary color light rays;

(b) a lens system for magnifying the picture from said color picture light source so that said picture is projected on a screen, said lens system having chromatic aberration and being designed so that a green image of the picture is sharply focued on said screen and red and blue images of the picture are not sharply focused on said screen particularly the areas of the picture incident on portions of the lens system remote from the center thereof; and (c) an optical filter for blocking the red and blue light rays from said color picture light source so that said red and blue light rays are transmitted to the screen only through the center portion of said lens system and filter, while the green light rays are transmitted to the screen by substantially the entire area of said lens system and filter.

2. A color picture projecting system comprising:
(a) a color picture light source for emitting three primary color light rays;
(b) a lens system for magnifying the picture from said color picture light source so that said picture is projected on a screen, said lens system having chromatic aberration and being designed so that a greenish image of the picture is sharply focused and red and blue images of the picture are not sharply focused on said screen particularly the areas of the picture incident on portions of the lens system remote from the center thereof; and
(c) an optical filter having first and second coaxial portions arranged in such a manner that said first portion is surrounded by said second portion, said first portion having an optical characteristic such that the red light rays incident on one side thereof are blocked, said second portion having an optical characteristic such that the red and blue light rays incident on one side thereof are blocked, said optical filter having a center portion through which all the red, green and blue light rays emitted from said color picture light source are incident on said screen.

3. A color picture projecting system as claimed in claim 1 or 2, wherein said optical filter has an annular shape.

4. A color picture projecting system as claimed in claim 1 or 2, wherein said lens system comprises two series lenses separately arranged so that longitudinal axes thereof are perpendicular to an optical axis of the rays, as incident on the lenses.

5. A color picture projecting system as claimed in claim 4, wherein said optical filter is placed between said two lenses.

6. A color picture projecting system as claimed in claim 2, wherein said first portion is a cyan optical filter and said second portion is a green optical filter.

7. An optical system for obtaining a color image from an optical spectral source, comprising:
(a) a lens system having chromatic aberration and designed so that an image of a particular wavelength of the spectral source is sharply focussed on a screen and images of other wavelengths of the spectral source are not sharply focused on said screen particularly areas of the source incident on portions of the lens system remote from the center thereof; and
(b) an aperture stop including an optical filter for reducing the amount of light transmitted through said lens system, said optical filter having a central first portion for passing all wavelengths of the source to the screen and a second portion located around said first portion for passing only light of the particular wavelength in the source to the screen.

8. An optical system for obtaining a color image from an optical spectral source, comprising:
(a) a lens system having chromatic aberration and designed so that an image of a particular optical wavelength of the spectral source is sharply focussed on a screen and images of other wavelengths of the spectral source are not sharply focused on said screen particularly areas of the source incident on portions of the lens system remote from the center thereof; and
(b) an aperture stop including an optical filter for reducing the amount of light transmitted through said lens system, said optical filter having a central first portion for passing all wavelengths of the source to the screen, and a second portion located around said first portion for passing only light of given wavelengths of the source to the screen, and a third portion located around said second portion for passing light of given wavelengths of the source to the screen, the wavelengths passed by the second portion differing from the wavelengths passed by the third portion.

* * * * *